Dec. 29, 1970   J. J. KOVAR   3,551,817
DOUBLET BIT SYNCHRONIZER AND DETECTOR
Filed Oct. 31, 1967   11 Sheets-Sheet 6

BOARD 2H
BIT SYNC ERROR DETECTOR

United States Patent Office 3,551,817
Patented Dec. 29, 1970

3,551,817
DOUBLET BIT SYNCHRONIZER AND DETECTOR
Joseph J. Kovar, Ridgecrest, Calif., assignor to the United States of America as represented by the Secretary of the Navy
Filed Oct. 31, 1967, Ser. No. 679,400
Int. Cl. H04b 1/06; H04l 7/00
U.S. Cl. 325—346        2 Claims

ABSTRACT OF THE DISCLOSURE

Demodulating apparatus is provided for a phase modulation communications receiver designed to obtain a time correlated measurement of the Doppler frequency received from an orbiting transmitter. The demodulating apparatus comprises a ONE:ZERO detector and a BIT SYNC Error Detector and is used to synchronize and detect the "ONES" and "ZEROS" transmitted as the phase modulated signals so that recovery of time information can be achieved.

GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

The communications system, of which the present invention forms a part is more fully described and illustrated in patent application Ser. No. 679,060, filed Oct. 30, 1967, by Loran F. McCormick et al. and The Phase Lock Loop mentioned below is the subject of U.S. Pat. No. 3,462,702 issued Aug. 19, 1969 to L. F. McCormick.

BACKGROUND OF THE INVENTION

Remote locations throughout the world have had difficulty in the determination of the time of day (with respect to Greenwich or "Zulu" time) to sufficient accuracy for space navigation. A measurable improvement in the determination of time is available in the form of phase modulated signals from the satellite itself.

This invention comprises equipment used to synchronize and detect the "ONES" and "ZEROS" transmitted as the phase modulated signals so that recovery of time information can be achieved.

The approach taken in decoding the phase modulated signal received by the NACODE Satellite Recovery Unit involves the use of an Analog Section which consists of three main parts: The Phase Lock Loop, the ONE:ZERO Detector and the BIT SYNC Error Detector. The VCO in the Phase Lock Loop is locked to the phase modulated signal and the VCO provides the gate signals for the ONE:ZERO and BIT SYNC Error Detectors. The ONE: ZERO Detector generates a pulse which corresponds to a binary bit ONE. The BIT SYNC Error Detector establishes and maintains the proper phase relationship (BIT SYNC in-phase) between the incoming phase modulated signal and the gate signals. The output of the ONE:ZERO Detector and the BIT SYNC Error Detector in the Analog Section are connected to the inputs of the Digital Section.

The Digital Section uses four binary counters, a shift register, a pseudo-random pattern generator, and an EXCLUSIVE OR gate to establish a confidence level in case of loss of BIT SYNC, to identify the coded time message and to issue the precisely timed output pulse.

SUMMARY

The phase Modulation Detector according to the present invention was designed for use in a time recovery unit of the satellite communications receiving stations described in the abovementioned Patent Application which were built by the Naval Weapons Center, China Lake, Calif. The basic function of the receiver utilizing the present invention is to obtain a time correlated measurement of the Doppler frequency received from the satellites. Because precise Doppler information is of prime importance, a phase modulated signal is used which consists of a complex pattern whose average phase error is zero. Each character consists of a phase modulated waveform with a deviation of 60 degrees, followed immediately with an equal pulse of the same magnitude but opposite phase, followed by zero phase for an equal period then a complement of the original phase pattern and another zero phase period. Thus each character consists of two doublet pulses and two spaces.

Operation of the doublet bit synchronizer and detector can best be explained by considering first the ONE:ZERO Detector and then the BIT SYNC synchronizer. The detectors are identical and receive a common input. The difference in their operation is determined by the gate signals which are used. A plus and minus degree phase modulated input is applied to a phase inverter whose outputs are the original signal and a one hundred-eighty degree phase inverted signal. The plus sixty degree phase portion of the signal is time added by a transistor gate and resistor summation network to the minus sixty degree portion after it has been phase inverted. The transistor gate output is a series of positive pulses if ones are present or a series of negative pulses if zeros are present. A normally open transistor switch in series between the summation network and the integrator is gated closed for two phase modulated pulses. After the second pulse has been integrated the integrator is reset by a gated discharge network. A pulse is created by the integrator reset. This trigger pulse is converted to the appropriate logic level by a delayed multivibrator whose output is a readout of the satellite memory.

The transistor gate output in the BIT SYNC Error Detector is a series of alternate positive and negative pulses if the system is synchronized. The integral of these equal energy but opposite polarity pulses is ZERO therefore no error pulses are generated by the synchronization multivibrator. However, if the system is not synchronized the integral will be NON ZERO since the pulses being integrated have not only equal energy but also the same polarity. The synchronization delayed multivibrator generates error pulses which are used to restore synchronization.

For a more complete understanding of the detector, its two major components will now be explained with reference to the drawing.

BRIEF DESCRIPTION OF THE SEVERAL VIEWS OF THE DRAWING

FIG. 1A is a diagram of the basic input waveform of a receiver in the system of FIG. 1.

FIG. 3A is a waveform diagram of a typical ONE, ZERO Count, —8 volt adjust in the ONE:ZERO Detector.

DETAILED DESCRIPTION OF THE INVENTION

The Satellite Time Recovery Unit, of which the present invention forms a part, was designed to decode a phase modulated signal having a signal-to-noise ratio of —12 db in a 3 kc. bandwidth. The decoding circuits in the Analog Section require a series of gating signals which are synchronized to the input phase modulated signal. In addition, the input signal carries a timing marker which starts a digital counter. This marker must be detected within ±0.1 millisecond of its actual occurrence.

Figure 1:
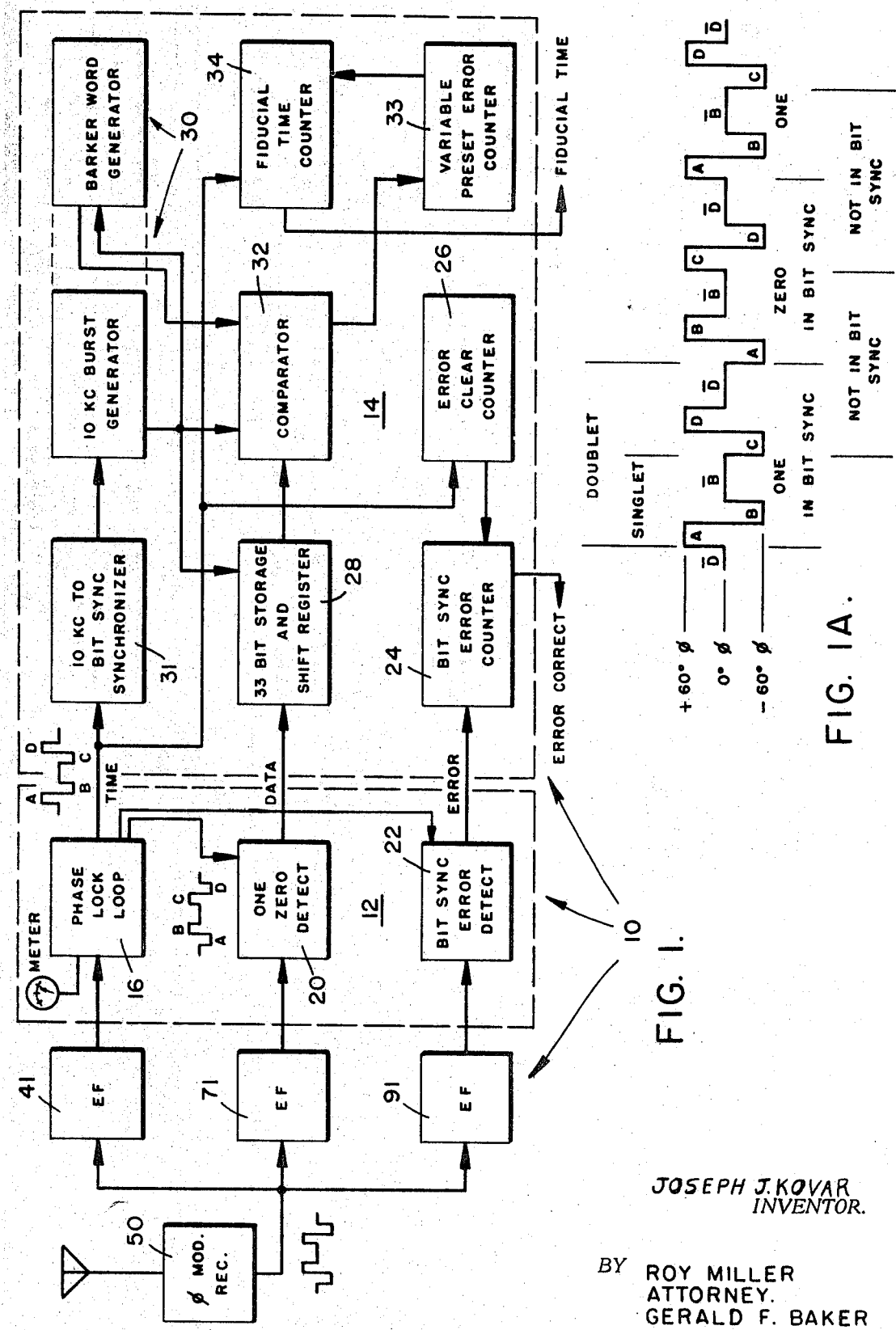
FIG. 1 is a simplified block diagram of a communications system including a detector according to the present invention.

Reference is now made to FIG. 1 which is a block diagram of the receiver system including the Time Recovery Unit 10. The basic function of the Time Recovery Unit 10 is that of issuing an output pulse a specific length of time after a coded signal has been received. The unit must, therefore, decode this signal, identify and separate it from the other data being transmitted, establish the proper time between identification and issuance of the pulse, and then issue the pulse. In addition, the Time Recovery Unit is capable of ensuring that it is properly synchronized with the input signals to be certain that the coded signal can be decoded. In practice, circuits are built into the unit for checkout and test.

As shown in FIG. 1, the Time Recovery Unit 10 comprises: a Phase Lock Loop 16, a ONE:ZERO Detector 20, a BIT SYNC Error Detector 22, a BIT SYNC Error Counter 24, a BIT SYNC Error Clear Counter 26, a 33-Bit Storage and Shift Register 28, a Barker Word Generator 30, a 10 KC to BIT SYNC SYNCHRONIZER 31, a Comparator 32, a Variable Preset Error Counter 33 and a Fiducial Time Counter 34. These circuits are divided into the sections of the unit as follows:

The Analog Section 12: Phase Lock Loop 16, ONE: ZERO Detector 20, BIT SYNC Error Detector 22.

The Digital Section 14: BIT SYNC Error Counter 24, BIT SYNC Error Clear Counter 26, 33-Bit Storage and Shift Register 28, Barker Word Generator 30, 10 KC to BIT SYNC Synchronizer 31, Comparator 32, Variable Preset Error Counter 33, Fiducial Time Counter 34.

Inputs to the three main components 16, 20, 22 of the Analog Section 12 are through emitter follower means 41, 71, 91 respectively and outputs from the components pass to the Digital Section 14.

The detection circuit means, which is the subject of the present invention, comprises the ONE:ZERO Detector 20 and the BIT SYNC Error Detector 22 in Analog Section 12. Gating signals are furnished to the Detectors by the voltage controlled oscillator 14 in Phase Lock Loop 16. Phase Lock Loop 16 may be more fully understood by reference to the above-mentioned Pat. No. 3,462,702.

Analog Section

Figure 2:
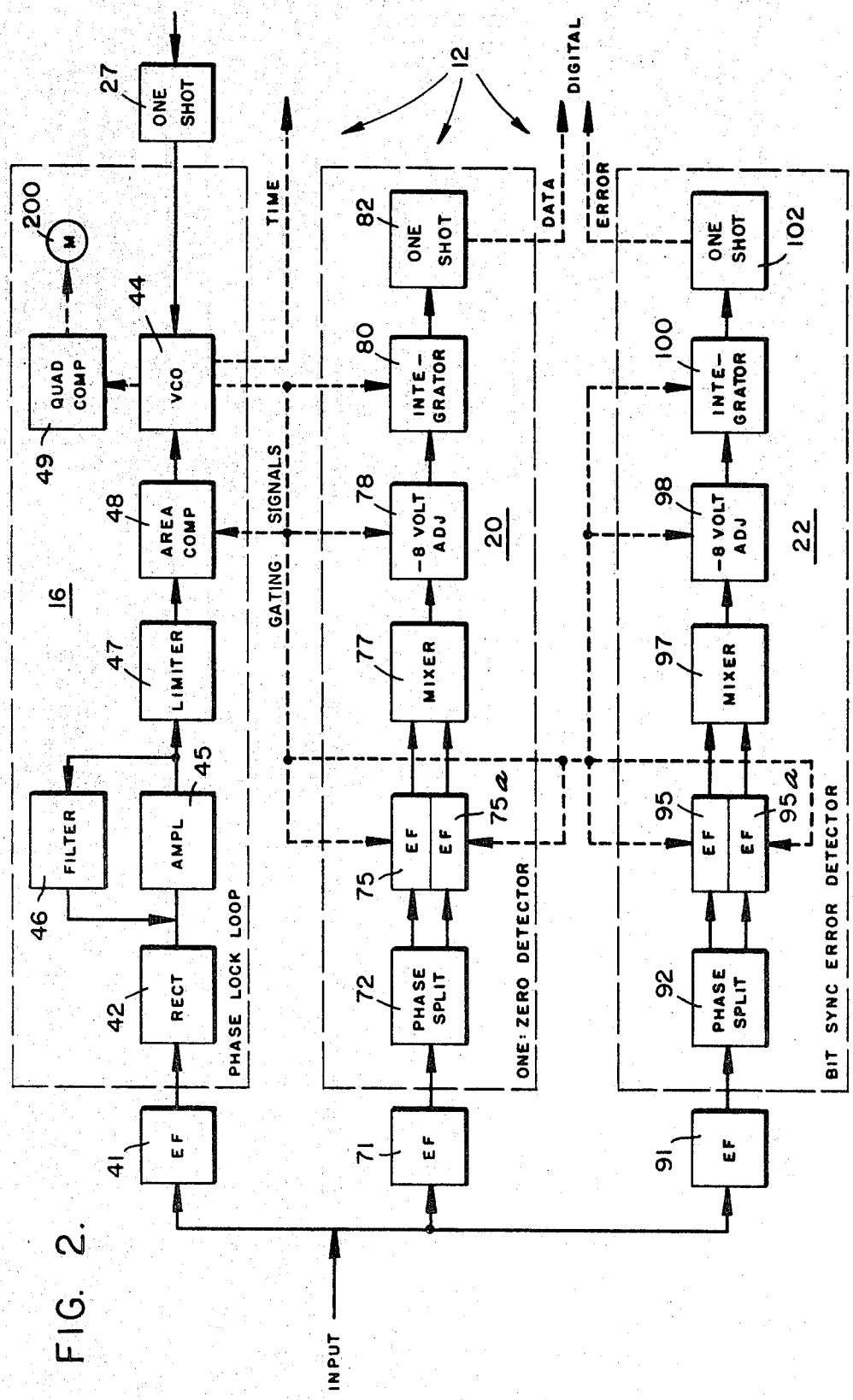
FIG. 2 is a simplified block diagram in greater detail of the Analog Section of the system of FIG. 1.

Referring now more particularly to FIGS. 1 and 2, it may be seen that the input to the Analog Section is applied through three emitter follower stages EF 41, 71, 91 which serve to isolate the inputs from each other and to match the impedance of the inputs to the downstream circuitry. The input signal arrives in the form of a coded series of phase-modulated positive and negative going bits. Each character consists of a phase modulated pulse with a 60-degree deviation followed immediately by a pulse of equal magnitude but opposite phase (see FIG. 1A). This is followed by a period, the duration of which is equal to the two preceding pulses, but a 0-degree deviation. The complement of the first pulse, followed by a 0-degree deviation equal to these two pulses then follows. FIG. 1A illustrates the shape of the input signal from the phase detector in the Phase-Modulated Receiver. The output of the receiver is supplied as the input of the Time Recovery Unit in the same essential form. FIG. 2 is a simplified block diagram of the Analog Section of the unit.

Phase Lock Loop

The Phase Lock Loop 16 synchronizes the "gating signals" to the input signal. This condition is known as LOCK and occurs whether or not the system is in BIT SYNC. The gating signals are the product of the Phase Lock Loop.

The input signal is rectified by diode rectifier 42 after passing through the input emitter follower 41, and the resultant modulated DC signal is passed through another emitter follower into an amplifier 45. This amplifier has a degenerative feedback loop containing notch filter 46. The notch is tuned to the fundamental frequency of the signal and the feedback thus greatly attenuates all but the fundamental signal. Circuit gain is low in order to prevent oscillation.

The output of the feedback amplifier 45 is passed through a diode limiter 47. The clipping level of the limiter is selected to allow high sensitivity in downstream stages, permitting the circuit to function at low signal levels and still permit high amplitude input signals. The clipping level is such that almost all signals passing through the limiter are slightly clipped. Waveform is not critical at this point in the circuit.

The next stage is a high-gain amplifier stage (not shown) which is used to drive the area comparator 48. The area comparator 48 (a phase comparison circuit) compares the difference in phase between the signal from the amplifier stage and the signal from the voltage controlled oscillator VCO 44. The area comparator 48 provides a driving voltage for the VCO 44. This voltage is dependent upon the phase difference between the two signals.

The VCO 44 drives flip-flop frequency dividers three of which are out of phase with the original input signal, and two are in phase with the original input signal. The out-of-phase flip-flops run at 1/2, 1/4, and 1/8 the frequency ($f$) of the VCO. The in-phase flip-flops run at 1/4$f$. Each flip-flop produces two outputs. These flip-flop outputs are the gating signals for the remainder of the Analog Section and the BIT SYNC CLOCK pulses for the Digital Section.

The detection circuit is composed of two parts. The first part discussed is the BIT SYNC Error Detector 22. This circuit establishes and maintains the correct phase relationship between the incoming doublet and the Phase Lock Loop 16. The second part 20 of the circuit detects the doublet bit which represents a ONE and produces an output pulse. When a ZERO is detected, there is no output.

Both circuits transform the input into a square wave which feeds an RC integrator. The integrator is necessary to average out noise when the input S/N ratio drops towards the −12 db minimum, the polarity of the square wave regulates the direction of charge such that a positive charge produces a pulse output from both circuits.

ONE:ZERO Detector

The ONE:ZERO Detector 20 (FIGS. 1 and 2) decodes the original input signal and converts the coded information into ONE and ZERO binary bits for the Digital Section 14. The actual output is in the form of a ONE count for each coded ONE in the original input signal, and no output (equal to a ZERO count) for each ZERO in the original input signal.

The input to the ONE:ZERO Detector is applied to a phase splitter 72 through an emitter follower 71. Of the two outputs of the phase splitter 72, the complementary output (180° to the input) is passed through a DC restoring circuit 73 (FIG. 3) to bring the DC level of the signal up to the DC level of the identical output (in-phase with the input). Both outputs of the phase splitter are applied to the input of a gated emitter follower, 75 and 75a respectively, through isolating diodes CR1 and CR4 (FIG. 4). As shown in FIG. 4 each of the gated emitter followers is double gated and requires two gating signals to conduct.

Gated emitter follower 75, handling the complementary signal, is gated by gating signals $\overline{Y}$ and $\overline{X}$ (See FIG. 3) and conducts during times B and C but not during times A, D, $\overline{B}$, and $\overline{D}$. Gated emitter follower 75a, handling the identical signal, is gated by gating signals X and Y and conducts during times A and D but not during times B, C, $\overline{B}$, and $\overline{D}$.

The outputs of the two gated emitter followers, 75, 75a, are added in the combiner 77. The combiner 77 is a simple diode mixer followed by an emitter follower $Q_5$. A −8 volt DC reference adjusting circuit 78 follows the emitter follower $Q_5$. This circuit establishes the base line bias voltage at −8 volts DC and also acts as a noise gate. This latter is accomplished by using a single gate similar in nature to the gates in the gated emitter followers. In this circuit, the gate conducts during times AB and CD, and does not conduct during times $\overline{B}$ and $\overline{D}$. FIG. 3A illustrates a typical ONE, ZERO count in this circuit.

Figure 9:
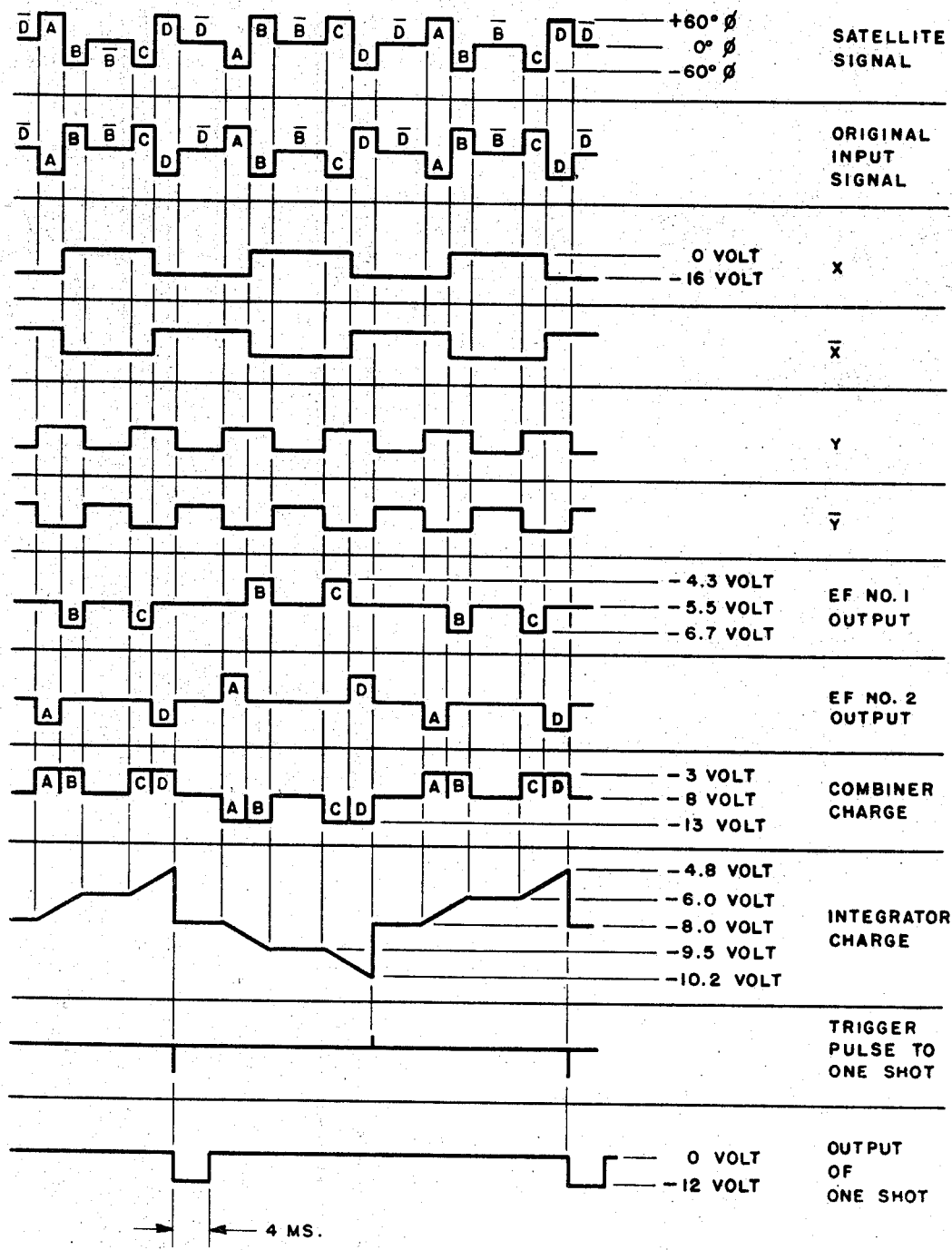
FIGS. 9–11, inclusive, are diagrammatical representations of the Waveform Histories respectively of the ONE: ZERO Detector, the BIT SYNC Error Detector IN BIT SYNC, and the BIT SYNC Error Detector $\overline{\text{IN}}$ BIT SYNC.

The output of the −8 volt adjust circuit 78 is applied to the input of the integrator switch 79. The integrator switch consists of a solid-state switch, actually a transistor $Q_8$ in series with the integrator 80, controlled by a gating signal. The transistor $Q_8$ is gated by the $\overline{Y}$ gating signal which causes the switch to conduct during times AB and CD and not during times $\overline{B}$ and $\overline{D}$. Refer to FIG. 9 for a history of the various signal and gating waveforms for the ONE:ZERO Detector.

The integrator 80 charges to some fraction of the potential of the signal while the switch 79 is conducting. The integrator 80 is discharged after every second input pulse. Integrator discharge is controlled by another gated solid-state switch 81. This switch is double-gated and is controlled by the Y and X gating signals. The integrator 80 is discharged through the discharge switch 81. The transistor in the discharge switch 81 is wired into the circuit so as to provide a larger negative-going pulse than a positive-going pulse. Since the pulse provided is generated in the same polarity as the direction of discharge, a negative-going discharge (−4.8 volts to −8.0 volts) results in an appreciable pulse, while a positive-going discharge (−10.5 volts to −8.0 volts) results in negligible output.

The output pulse 81P of the integrator 80 is used to trigger a one-shot multivibrator 82. The one-shot is triggered only by negative pulses and, when triggered, delivers a 4 ms. long, −12 volts square pulse 82P.

The design of the circuit is such that each doublet ONE results in an output pulse from the one-shot. Each doublet ZERO results in no output from the one-shot.

BIT SYNC Error Detcetor

Figure 6:
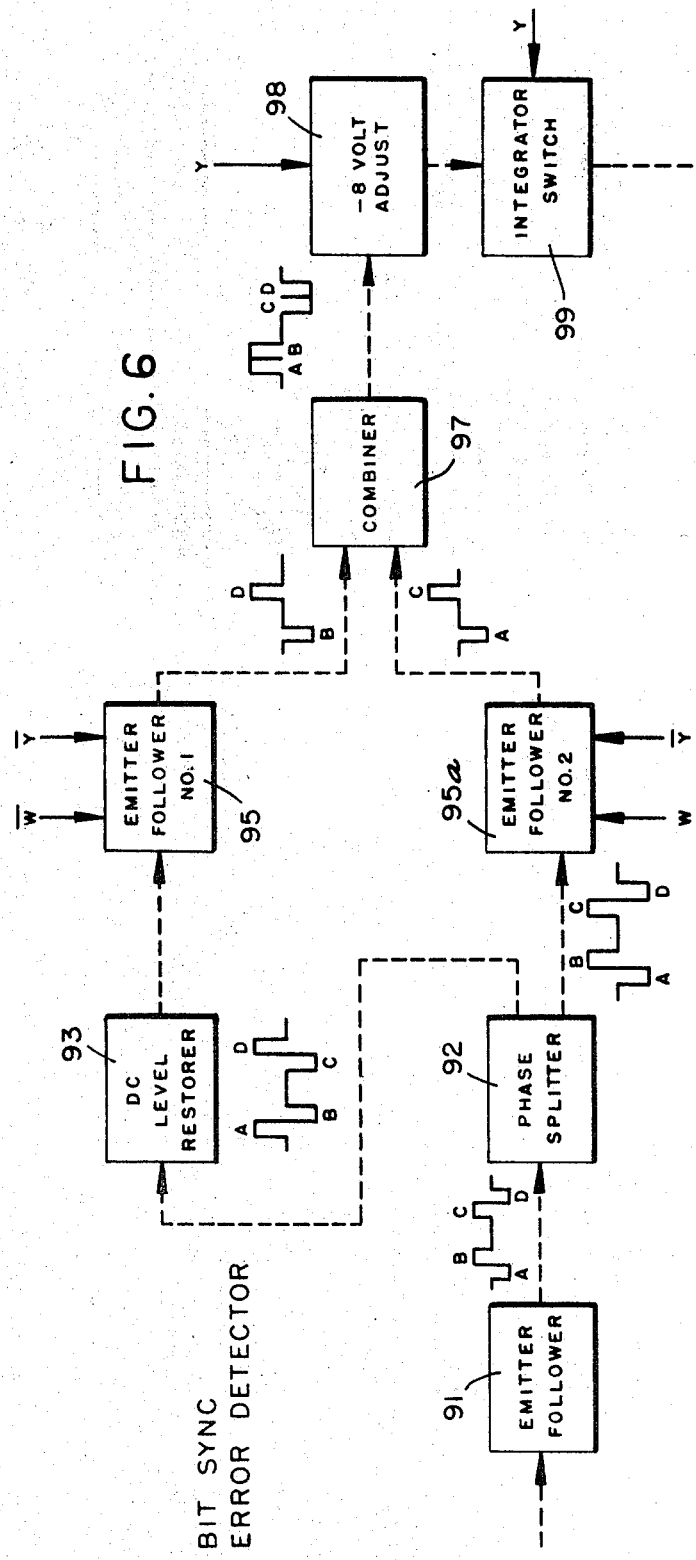
FIG. 6 is a block diagram of the BIT SYNC Error Detector.

As shown in FIG. 6, almost all the circuitry and circuit functions in the BIT SYNC Error Detector 22 are the same as those in the ONE:ZERO Detector 20. Except for the absence of one capacitor in the BIT SNYC Error Detector and differences in the connection of the gating signals, the two circuits are identical. FIG. 6 is a block diagram of the BIT SYNC Error Detector 22.

Where the ONE:ZERO Detector is designed to issue an output pulse each time a doublet ONE is received, the BIT SYNC Error Detector is designed to issue no output pulse so long as the unit is IN BIT SYNC. However, when the unit is $\overline{\text{IN}}$ BIT SYNC, the BIT SYNC Error Detector produces an output pulse each time a doublet ONE is followed by a doublet ZERO. The BIT SYNC Error Detector cannot determine the unit is $\overline{\text{IN}}$ BIT SYNC when either a series of doublet ONE or doublet ZERO counts are received, and only issues a BIT SYNC ERROR PULSE when a doublet ONE count is followed by a doublet ZERO count, and only when the unit is $\overline{\text{IN}}$ BIT SYNC.

The first stages of the BIT SYNC Error Detector function like the similar stages in the ONE:ZERO Detector. The input signal is passed through an emitter follower 91 into a phase splitter 92. The complementary signal from the phase splitter is passed through a DC restorer 93 and into a gated emitter follower 95. The identical signal is applied directly to a gated emitter follower 95a.

Emitter follower 95 in the BIT SYNC Error Detector is gated by gating signals $\overline{W}$ and $\overline{Y}$. It is open during times B and D, and is closed during times A, C, $\overline{B}$, and $\overline{D}$. Emitter follower 95a is gated by gating signals W and Y, and is open during times A and C. It is closed during times B, D, $\overline{B}$, and $\overline{D}$.

Figure 6A:
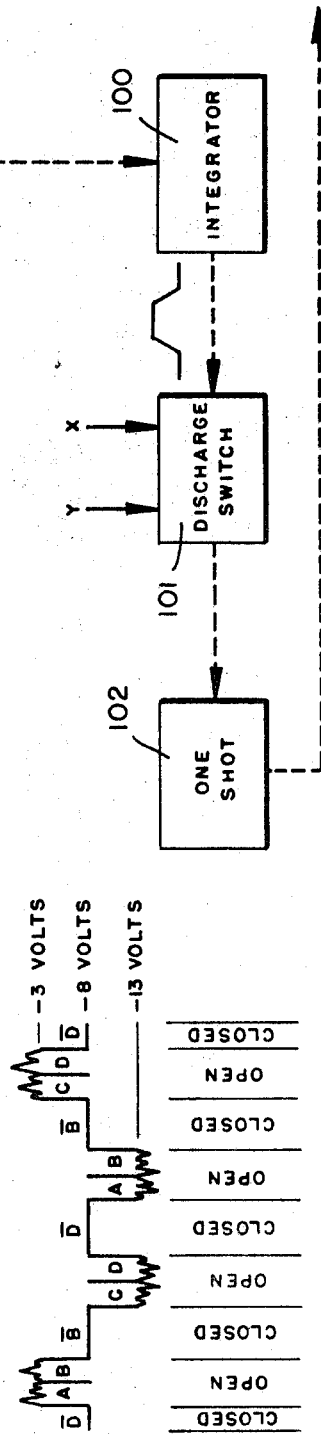
FIG. 6A is a waveform diagram of the typical ONE: ZERO Count, —8 volt adjust in the BIT SYNC Error Detector.

The output of the two emitter followers are mixed in the mixer or combiner 97. Refer to FIG. 6A for a typical waveform in the −8 volt reference adjust 98. The −8 volt reference adjust 98 is gated by the Y gating signals.

Figure 10:
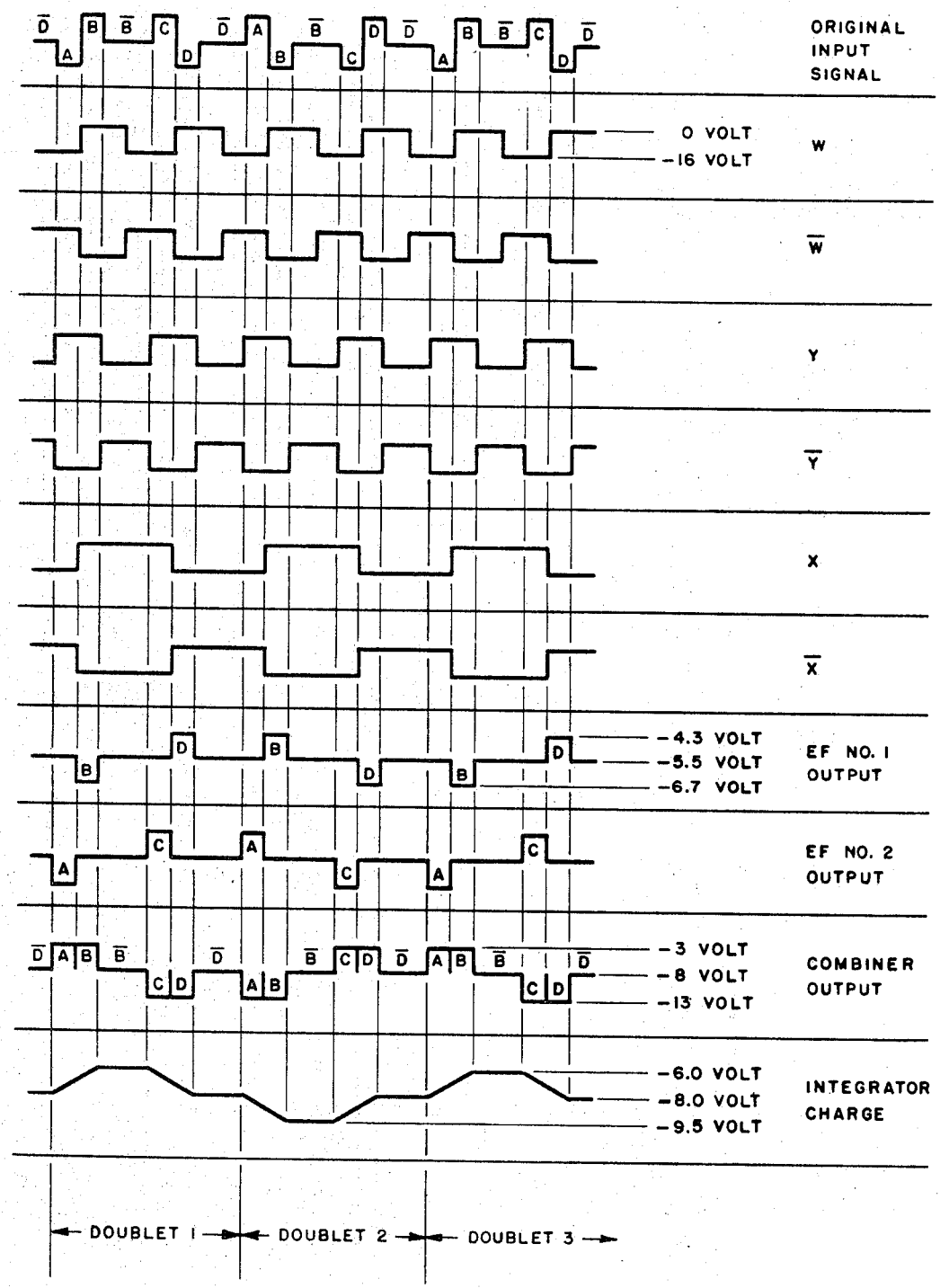

The integrator switch 99 is gated by the $\overline{Y}$ gating signal and the discharge switch 101 is gated by the X and Y gating signals. The integrator 100 charges in the same manner as the integrator 80 in ONE:ZERO Detector 20 but with a different waveform. Refer to FIG. 10 for the waveform history of the BIT SYNC Error Detector IN BIT SYNC, and FIG. 11 for the waveform history $\overline{\text{IN}}$ BIT SYNC. These should be compared with FIG. 9 to illustrate the difference in function between the ONE:ZERO Detector 20 and the BIT SYNC Error Detector 22.

ONE:ZERO Detector

Figure 3:
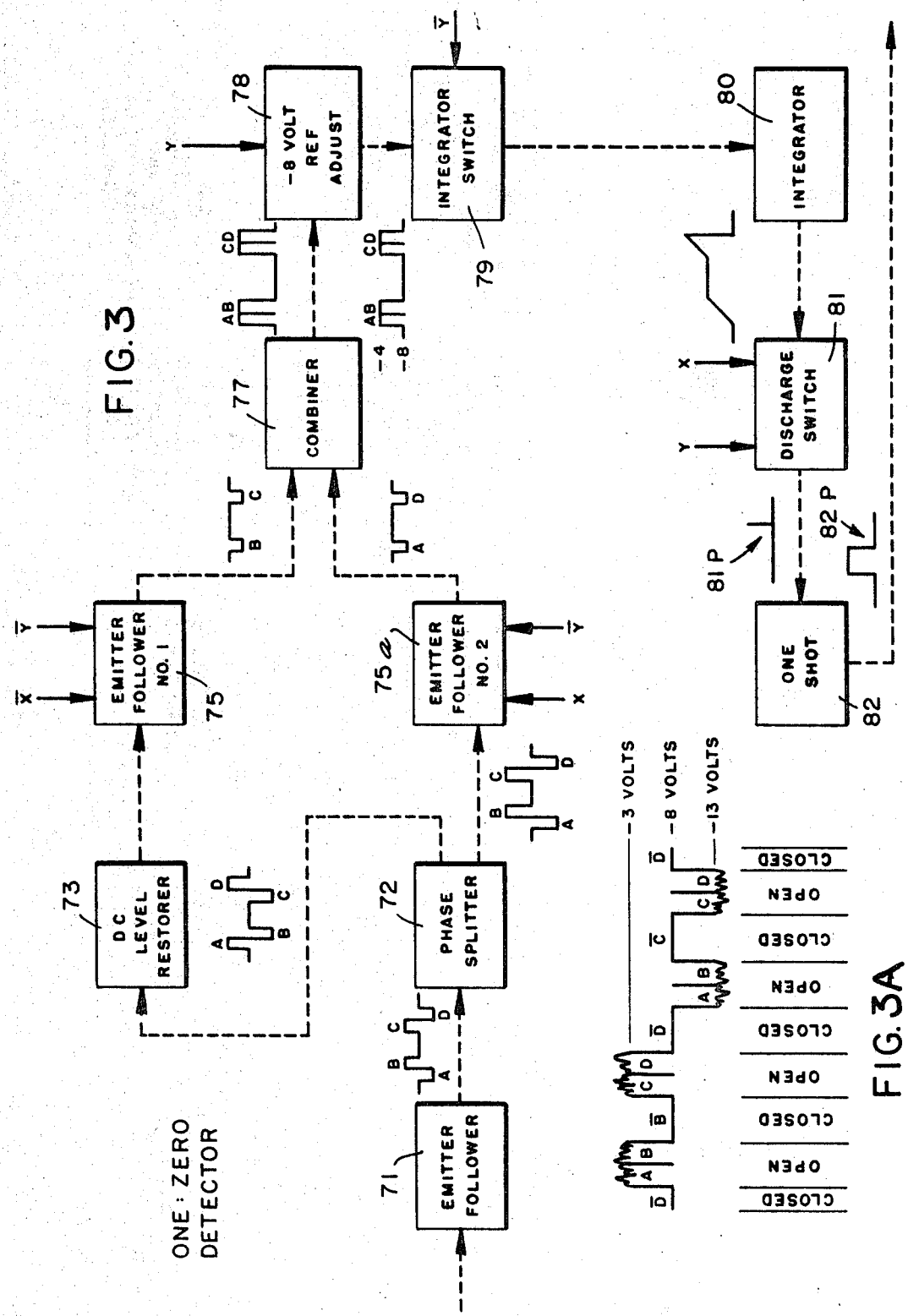
FIG. 3 is a block diagram of the ONE:ZERO Detector.
Figure 4:
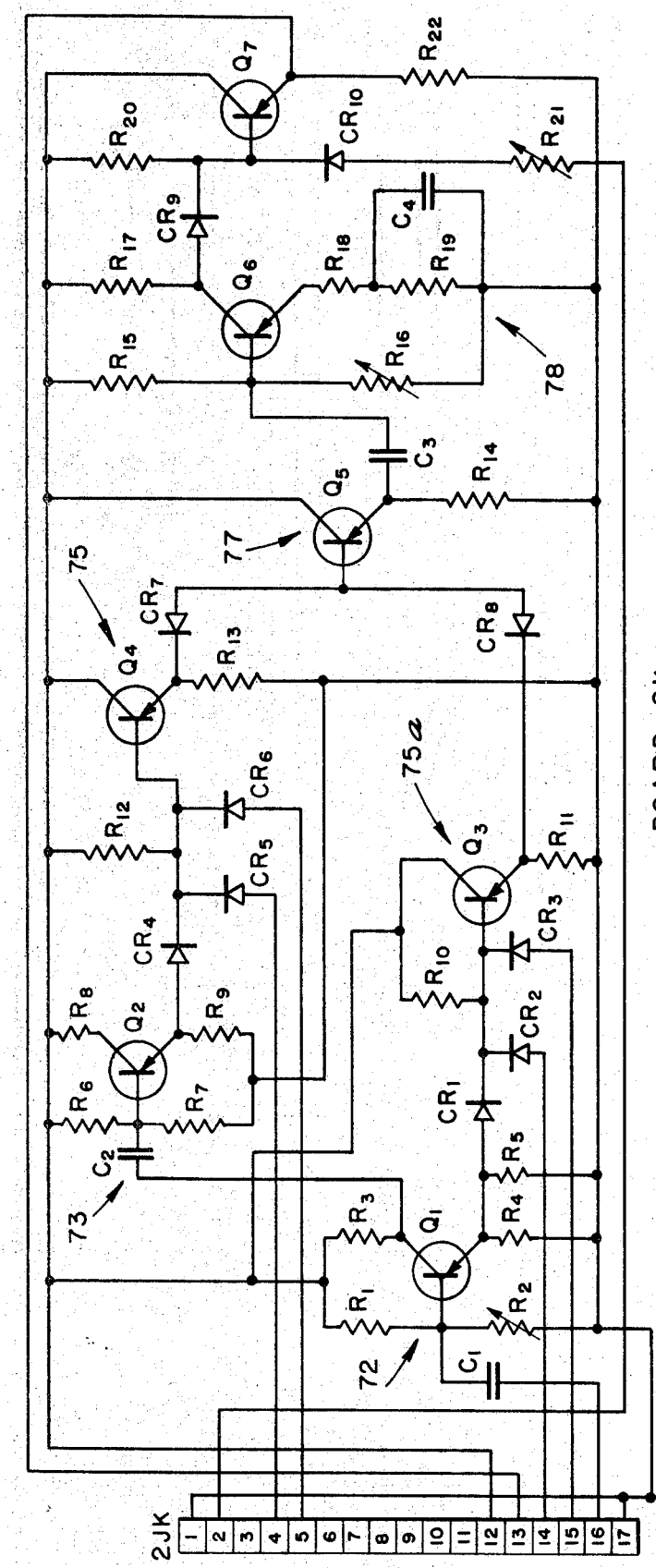
FIGS. 4 and 5 are circuit diagram of boards 2K and 2L respectively which constitute the ONE:ZERO Detector.
Figure 5:
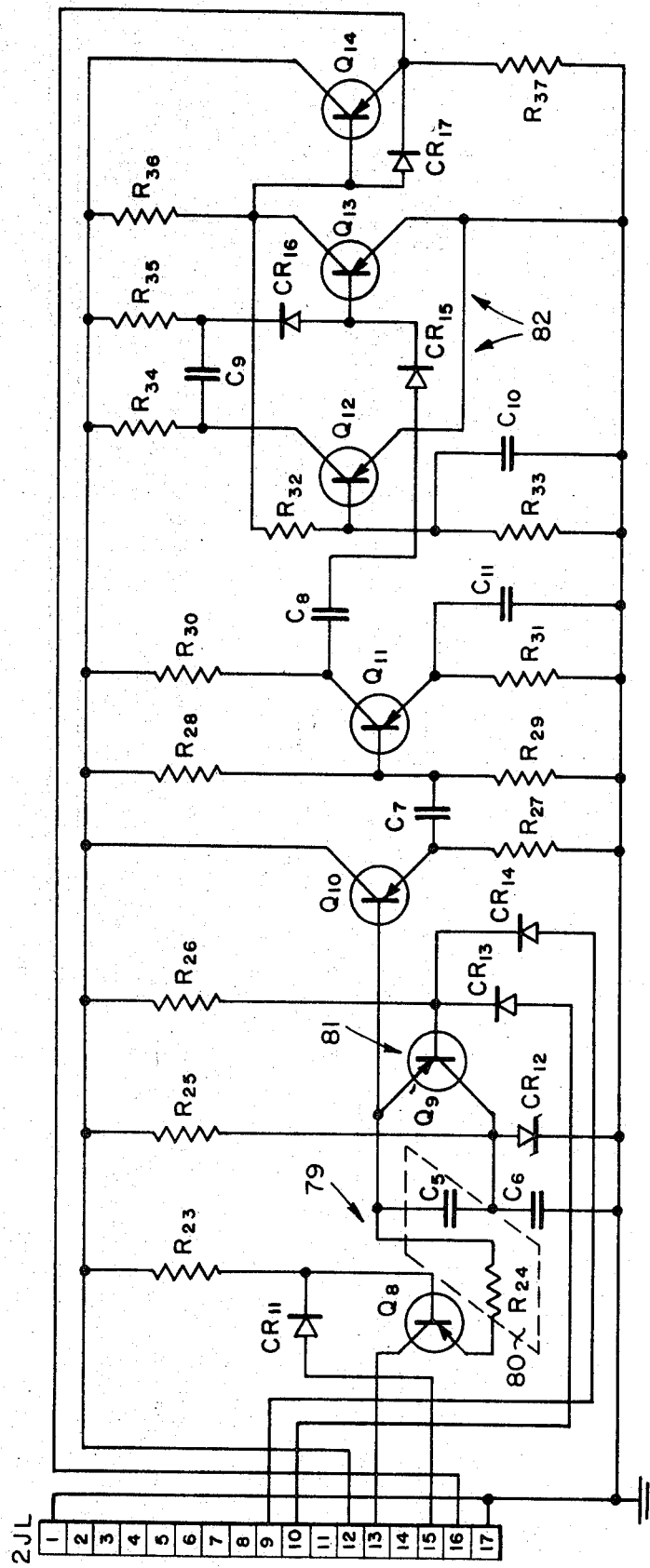

The ONE:ZERO Detector circuit consists of two printed circuit boards (FIGS. 4 and 5) and is shown in block diagram form in FIG. 3. These two boards occupy positions 2K and 2L in the time recovery unit. The phase modulated input to board 2K comes from a pair of impedance matching emitter followers. The gain of the phase splitter stage 72 is set so that at equal amplitude, but 180 degrees out of phase, signals appear at the collector and emitter of the phase splitting transistor $Q_1$. The phase modulated signal from the collector is fed to a DC restorer 73 which sets the DC level of the signal to equal the DC level of the signal seen at the emitter of the phase splitter 72. This is necessary because the signal from emitter follower gate 1 (75) and emitter follower gate 2 (75a) will be combined and must have identical DC values.

The gate signals which are applied to the ONE:ZERO and the BIT SYNC Error Detectors 20 and 22 respectively are derived from the VCO 44 in the Phase Lock Loop 16 through a series of divide-by-two circuits. Emitter follower gate (75) is gated on by gate signals $\overline{X}$ and $\overline{Y}$ (FIG. 9) only during the portions of the phase modulated signal marked B and C, and emitter follower gate 75a is gated on by gate signals X and $\overline{Y}$ only during the portions of the phase modulated signal marked A and D. These gate signals are shown with respect to the phase modulated signal in FIG. 9. A diode (CR7, CR8) is connected from the emitter in each of the emitter follower gates 75, 75a to the base of a transistor $Q_5$. Diode combining is accomplished in this way.

The integrator 80 is designed to integrate positive and negative signals with respect to a set reference. Since the system has a −16 volt supply it is desirable to set the integrator reference to −8 volts DC. The reference adjust 78 adjusts the zero degree portion of the phase modulated signal to −8 volts. The output of board 2K is the output of the −8 volt reference adjust and the binary signal shown in FIG. 9. A transistor $Q_8$ on circuit board 2L is connected in series with the integrator circuit. This transistor serves as a gate which disconnects the integrator 80 from the input signal by the use of gate $\overline{Y}$ and it does so when the phase modulated signal is at zero degrees. There are two reasons for this; the first is to keep the integrator 80 from discharging between signal pulses, and the second is to prevent noise from being integrated during the times mentioned above. The sequential operation of the integrator can now be traced.

When pulse AB (FIG. 9) arrives at the integrator 80, the integrator is connected to the input signal and it charges to some value. The transistor gate (integrator switch 79) is now opened by gate signal $\overline{Y}$ and the charge remains in the integrator 80 until time CD, when the integrator is again reconnected and charges to a new value. The integrator 80 is again disconnected from the input circuit and the integration capacitor C5 is discharged by the use of a transistor switch $Q_9$ which is connected across the integration capacitor. The transistor switch $Q_9$ is turned on by gate signal X and Y.

If, after integration, the results are positive with respect to the −8 volt reference, a trigger pulse C/P will be generated by the discharge of the integration capacitor. This trigger pulse, shown in FIG. 9, will be amplified in the integrator discharge circuit and will be used to trigger a one-shot DMV 82. The DMV output 82P is fed to the digital section.

BIT SYNC Error Detector

Figure 7:
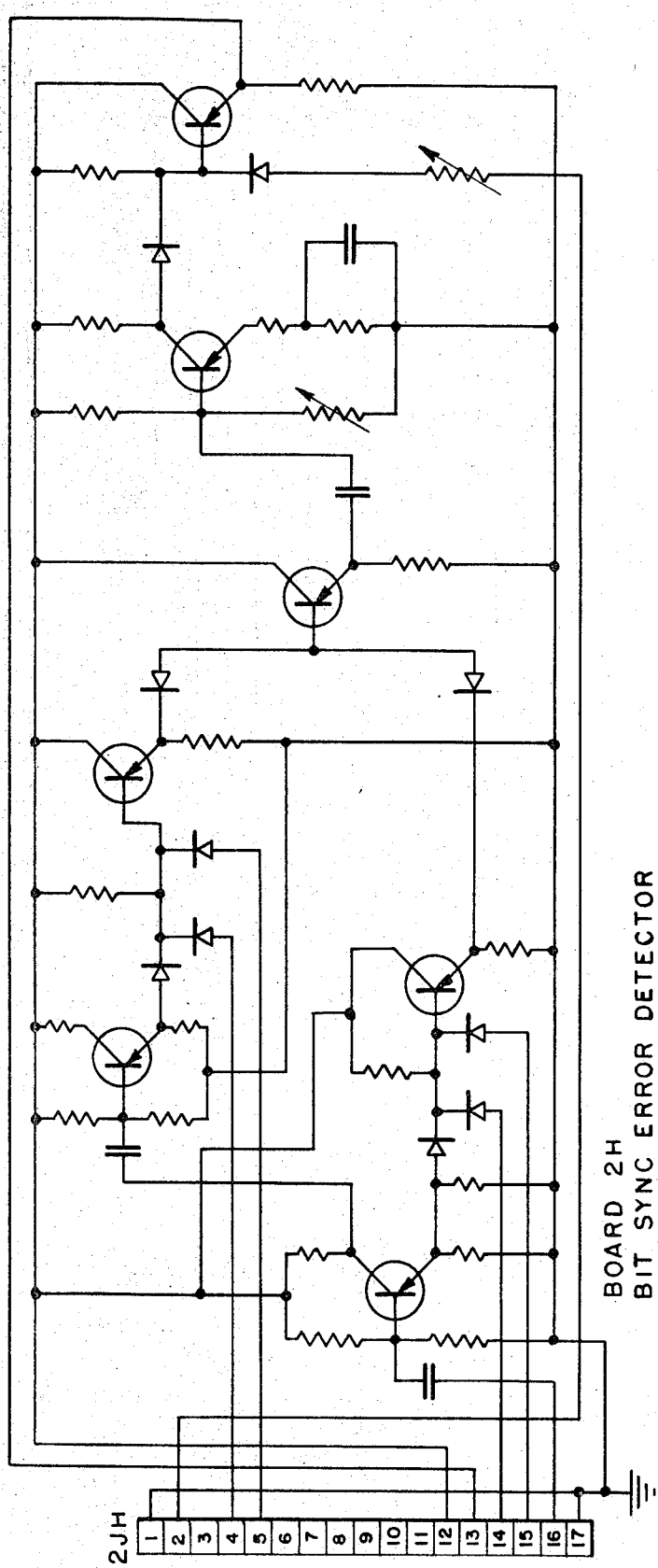
FIGS. 7 and 8 are circuit diagrams of boards 2H and 2J respectively which constitute the BIT SYNC Error Detector.
Figure 8:
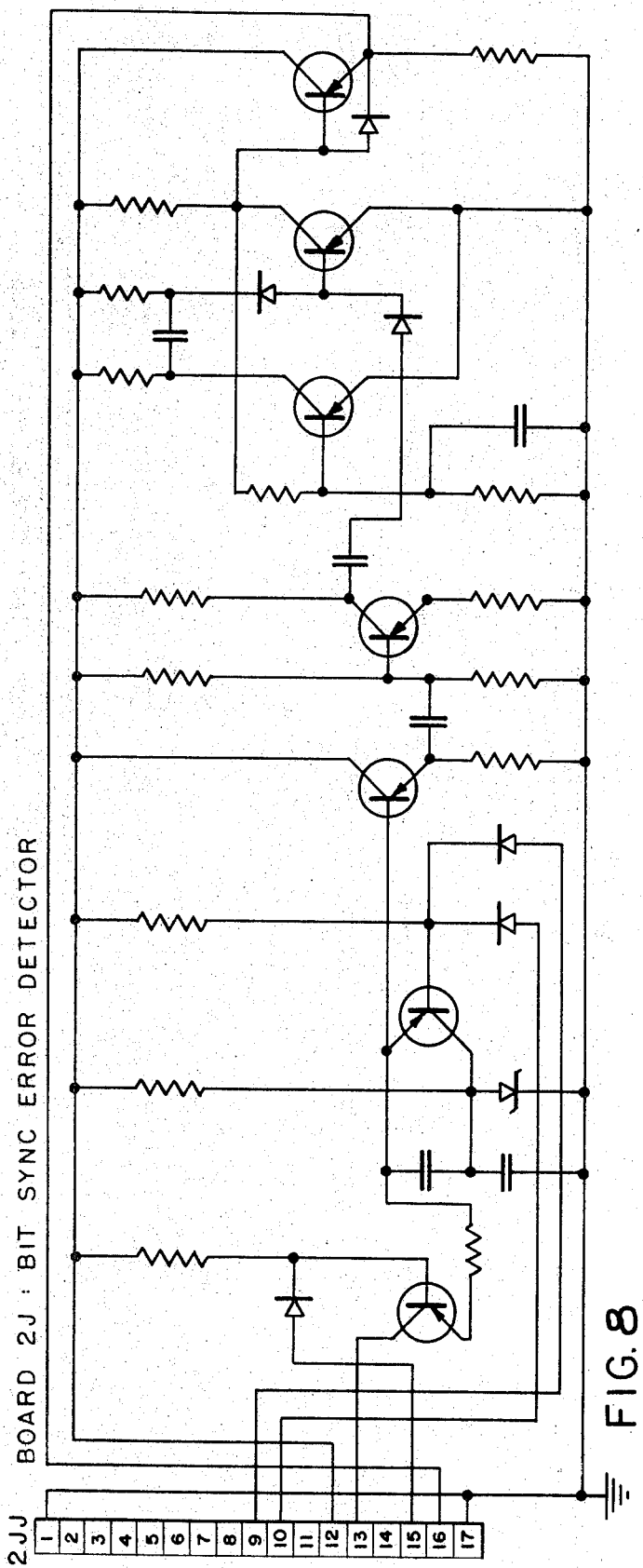

The BIT SYNC Error Detector circuit consists of two printed circuit boards occuping positions 2H and 2J (FIGS. 7 and 8). The description in paragraphs immediately supra dealt with the operation of the ONE:ZERO Detector 20 when bit synchronization was in phase. This means that integration in the ONE:ZERO Detector was carried out on a complete binary bit such as pulses AB and CD in FIG. 9. There will be two considerations given to the BIT SYNC Error Detector; one will be when the system is BIT SYNC in-phase and the second will be when the system is BIT SYNC out-of-phase. BIT SYNC out-of-phase means that integration in the ONE:ZERO Detector is carried out on ½ of one binary bit CD and ½ of the next binary bit AB. The BIT SYNC Error Detector, shown in block diagram form in FIG. 6, is similar to the ONE:ZERO Detector circuit; in fact there is only one component change from the ONE:ZERO Detector circuit 20. If capacitor C11 (FIG. 5) is removed from the ONE:ZERO Detector circuit, the BIT SYNC Error Detector circuit (FIGS. 7 and 8) results. This capacitor C11 is an emitter bypass capacitor and its removal from the circuit greatly reduces the gain of the trigger amplifiers. This is necessary because it is undesirable to generate BIT SYNC error commands due to noisy signals. The other difference between the two detectors is in the gate signals which are applied to the emitter follower gates.

Figure 11:
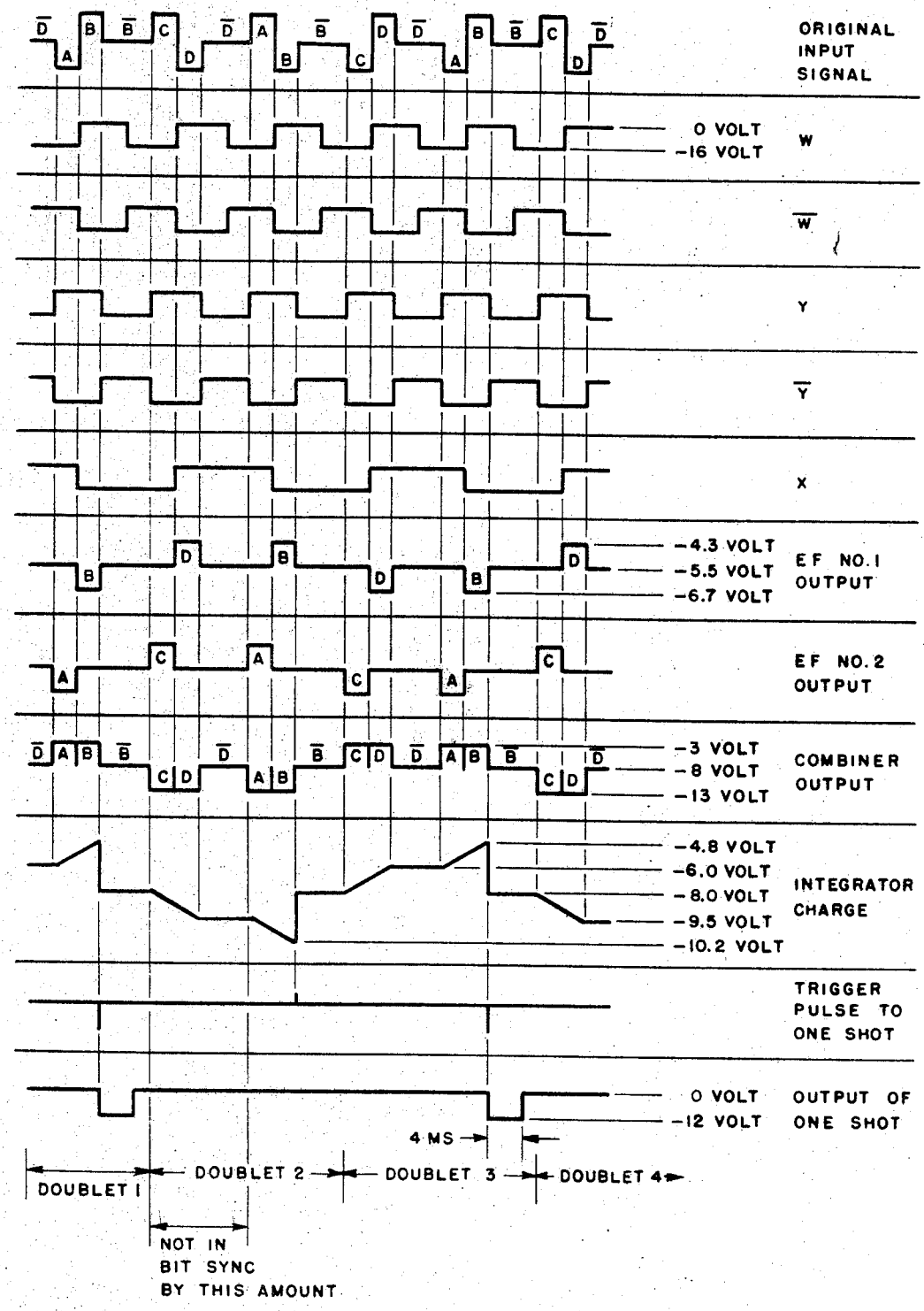

Emitter follower gates 95 is gated on by gate signals $\overline{W}$ and $\overline{Y}$ (FIG. 10) only during the portions of the phase modulated signal marked B and D, and emitter follower gate 2 is gated on by gate signals W and $\overline{Y}$ only during the portion of the phase modulated signal marked A and C. The gate signals are shown with respect to the phase modulated signal. Reference to FIG. 10 will show that the waveforms in this detector are similar to the waveforms in the ONE:ZERO Detector circuit, however, mention should be made of the integrated signal in the BIT SYNC circuit. FIG. 10 shows that the integration result is ZERO. Thus, there is no output from the DMV 82 when the system is BIT SYNC in-phase. But when the system is BIT SYNC out-of-phase, the following conditions exist. Emitter follower gate 95 is gated on only during portions of the signal marked D and B, and emitter follower gate 95a is gated on only during portions of the signal marked C and A (FIG. 11). The gate signals are again shown here. There is a positive value in the BIT SYNC Error Detector integrator. This integrator circuit now works the same way as does the ONE:ZERO Detector circuit when the system is BIT SYNC in-phase. The DMV 102 output is seen corresponding to the trigger pulse. The output of the BIT SYNC DMV 102 is counted in the Digital Section 14 and when a count of nine is reached, the counter triggers a one-shot DMV 27 in the Phase Lock Loop section 16. The one-shot DMV output is used to inhibit one trigger pulse to the X and $\overline{X}$ flip-flop 62. This causes the flip-flop to shift its output by one-half cycle which establishes BIT SYNC in-phase.

Obviously many modifications and variations of the present invention are possible in the light of the above teachings. It is, therefore, to be understood that within the scope of the appended claims the invention may be practiced otherwise than as specifically described.

What is claimed is:

1. Demodulating means for doublet coded signals comprising:
   first gated integrator detector means receiving and decoding a doublet coded signal and converting the coded information into ONE and ZERO binary bits;
   second gated integrator detector means receiving said signal and producing an output only if said signal is being processed in proper timed relationship;
   said first detector means producing a ONE count pulse for each coded ONE in the received signal and no output for each coded ZERO in the received signal; and
   said second detector means under the stated relationship producing an ERROR output each time a doublet ONE is followed by a doublet ZERO, indicating that the incoming signal is being processed out-of-phase, so that following equipment may accept or reject said coded information from said first integrator detector means on the basis of the error output of said second detector means and, in the latter case, processing of the received signal may be corrected.

2. Demodulating means according to claim 1 in which said detector means are detectors of doublet coded, phase modulated signals and each said detector means includes:
   phase inverter means;
   first and second gating means;
   summation means; and
   delay multivibrator means;
   said phase modulated signals being applied to said phase inverter means;
   said inverter means having an output of the original signal and a one hundred-eighty degree phase inverted signal;

each output signal of said inverter being passed through a portion of said first gating means and the two signals time added in said summation means;

the output signal from said summation means is passed through said second gating means to said delay multivibrator, said second gating means being such that when the system is in phase, the output of the delay multivibrator of said first detector means will constitute a readout of the coded data being transmitted; and the output of said second detector means will be zero.

References Cited

UNITED STATES PATENTS 3,394,313  7/1968  Ellis et al. _____ 178—67
3,278,851  10/1966  Damon et al. _____ 325—321

ROBERT L. GRIFFIN, Primary Examiner

A. J. MAYER, Assistant Examiner

U.S. Cl. X.R.

325—322, 324, 325, 423; 178—69.5